(12) United States Patent
Akashi et al.

(10) Patent No.: US 8,364,313 B2
(45) Date of Patent: Jan. 29, 2013

(54) ROBOT SYSTEM

(75) Inventors: Akira Akashi, Kitakyushu (JP); Michiharu Tanaka, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 1203 days.

(21) Appl. No.: 12/279,462

(22) PCT Filed: Feb. 1, 2007

(86) PCT No.: PCT/JP2007/051728
§ 371 (c)(1), (2), (4) Date: Aug. 14, 2008

(87) PCT Pub. No.: WO2007/094175
PCT Pub. Date: Aug. 23, 2007

(65) Prior Publication Data
US 2009/0069943 A1 Mar. 12, 2009

(30) Foreign Application Priority Data
Feb. 14, 2006 (JP) ................. 2006-036253

(51) Int. Cl.
*G05B 15/00* (2006.01)
*G05B 19/00* (2006.01)
(52) U.S. Cl. ........... 700/264; 700/245; 700/258; 901/1; 901/3; 901/46; 318/568.11; 318/568.12; 318/568.13; 318/568.14; 318/568.16
(58) Field of Classification Search ............. 700/245, 700/258, 264; 901/1, 3, 4, 46; 318/568.11, 318/568.12, 568.13, 568.14, 568.16
See application file for complete search history.

(56) References Cited

U.S. PATENT DOCUMENTS

| 5,608,299 | A | * | 3/1997 | Hashimoto et al. ...... 318/568.11 |
| 5,748,854 | A | * | 5/1998 | Watanabe et al. ............. 700/258 |
| 5,760,560 | A | * | 6/1998 | Ohya et al. ................. 318/568.1 |
| 5,937,143 | A | * | 8/1999 | Watanabe et al. ............. 700/264 |
| 6,032,086 | A | * | 2/2000 | Hashimoto et al. ........... 700/245 |
| 6,051,894 | A | * | 4/2000 | Shimogama ................. 307/125 |
| 6,560,513 | B2 | * | 5/2003 | Krause et al. ................. 700/264 |

(Continued)

FOREIGN PATENT DOCUMENTS

| JP | 58-151608 A | 9/1983 |
| JP | 61-051207 A | 3/1986 |

(Continued)

OTHER PUBLICATIONS

Office Action issued on Apr. 6, 2012 by the Japanese Patent Office in the counterpart Japanese Patent Application No. 2008-500438.

*Primary Examiner* — Khoi Tran
*Assistant Examiner* — Jamie Figueroa
(74) *Attorney, Agent, or Firm* — Sughrue Mion, PLLC

(57) ABSTRACT

The safety of an operator which may be endangered by an erroneous instruction by the operator or a robot control system is ensured by making more stringent a condition regarding the separation of the operator from the vicinity of a robot when an operation program of the robot is activated. An interlock to which a condition regarding activation of the operation program of the robot is added is provided in a feeding unit which is connected to a robot controlling unit by wireless connection for charging a teaching unit, so as to provide a robot system which improves the safety of the operator.

5 Claims, 3 Drawing Sheets

U.S. PATENT DOCUMENTS

| | | | |
|---|---|---|---|
| 7,030,363 B2 * | 4/2006 | Watanabe et al. | 250/221 |
| 7,783,387 B2 * | 8/2010 | Calcagno | 700/264 |
| 7,863,848 B2 * | 1/2011 | Sjoberg | 318/568.11 |
| 2002/0045970 A1 * | 4/2002 | Krause et al. | 700/264 |
| 2004/0089793 A1 * | 5/2004 | Watanabe et al. | 250/221 |
| 2005/0166413 A1 * | 8/2005 | Crampton | 33/503 |
| 2006/0108960 A1 * | 5/2006 | Tanaka et al. | 318/568.21 |
| 2006/0232236 A1 * | 10/2006 | Calcagno | 318/568.11 |
| 2006/0279245 A1 * | 12/2006 | Hashimoto et al. | 318/568.12 |

FOREIGN PATENT DOCUMENTS

| | | |
|---|---|---|
| JP | 05-050390 A | 3/1993 |
| JP | 05-204439 A | 8/1993 |
| JP | 5-78488 U | 10/1993 |
| JP | 2000-024971 A | 1/2000 |
| JP | 2003-311665 A | 11/2003 |
| JP | 2004-17223 A | 1/2004 |
| JP | 2004-230539 A | 8/2004 |

* cited by examiner

ROBOT SYSTEM

TECHNICAL FIELD

The present invention relates to a power feeding apparatus to a teaching unit in a robot system in which information is transmitted using wireless connection between a robot controlling unit and the teaching unit and more particularly to an interlock for activating an operation program for an operation carried out by a robot.

BACKGROUND ART

In a teaching playback type robot, the registration of predetermined positions and input/output control commands of operations of operation jigs is implemented by operating the robot by operating a portable teaching unit (also referred to as a pendant) in a teaching mode of the robot using an operation procedure carried out by the robot as an operation program.

Since this teaching unit is controlled by an operator who holds it, weight and size reductions have been taken into consideration. However, to receive a power supply from the robot controlling unit and transmit and receive signals, the teaching unit has been connected by a composite cable in which a power supply line and a signal line are combined.

However, when the operator registers a position of the robot in the vicinity of the robot, the cable of the teaching unit gets entangled with equipment lying on the periphery of the robot or the cable is too short to reach a desired position, whereby there is sometimes caused a problem with teaching the robot, this having given rise to a strong demand for eliminating the cable. As a measure to deal with this demand, there has been proposed an idea of using wireless connection for transmission and reception of signals (refer, for example, to JP-A-58-151608). A power supply to a teaching unit is configured to be implemented by a battery that the teaching unit possesses, and to charge the battery, there have been proposed various ideas which have now been implemented on cordless telephones and portable wireless telephones, for example.

A conventional robot system will be described using a block diagram shown in FIG. 5.

In the figure, a robot 101 is connected to a robot controlling unit 102, and a teaching unit 103 is also connected to the robot controlling unit 102. The robot 101 is surrounded by a safety protective fence 104 so as to prevent an erroneous access to an operational range of the robot 101 by an operator working on the periphery of the robot 101 in operation, and an open-close detection unit 106 for detecting an open-close of a safety protective fence door 105 is mounted at an exit/entrance in the safety protective fence 104, an open-close signal from the open-close detection unit 106 being connected to the robot controlling unit 102. When the operator enters the area within the safety protective fence 104 for operation while the robot 101 is in operation, the operator opens the safety protective fence door 105, an opening signal from the open-close detection unit 106 is outputted to the robot controlling unit 102, and the robot controlling unit 102 cuts off a power supply to a motor, not shown, which is provided on the robot 101 to stop the driving of the robot 101 and similarly stops the operation of the robot with a brake, not shown, and holds the posture of the robot 101.

When teaching the robot 101, by selecting a teaching mode by a control section 107 provided on a control panel of the robot controlling unit 102, the teaching unit 103 or an external input signal, not shown, the safety protective fence door 105 is opened, and even though the opening signal is being outputted from the open-close detection unit 106, by operating an enable switch, not shown, which is equipped on the teaching unit 103, the power supply to the motor is enabled. By operating a robot arm control key, not shown, which is provided on the teaching unit 103 in such a state that power is being supplied to the motor, the robot 102 is put into operation, and the addition of a teaching point or registration of a modification is made to an operation program which is an operation procedure for an operation that is carried out by the robot 101. When the teaching operation is completed, the operator gets out of the safety protective fence 104 and closes the safety protective fence door 105, whereupon a closure signal is outputted from the open-close detection unit 106 to the robot controlling unit 102. In this state, by selecting an automatic operation mode (also referred to as a repeat mode) by the control section 107, the teaching unit 103 or an external input signal, a power supply command to the motor can be received, and when a power supply command is inputted, power is supplied to the motor, and thereafter, by receiving an operation start command from the control section 107, the teaching unit 103 or an external input, a reproducing operation of the operation program is started.

In addition, in activating the operation program in the way described above, to prevent the operator from being exposed to a danger, the safety of the operator is required to be ensured by keeping him or her off the vicinity of the robot. To enhance the safety further, there has been proposed an idea in which a sensor is provided at the exit/entrance in the safety protective fence 104, so that the existence of the operator or an intruder is verified based on an output signal from the sensor (refer, for example, to Patent Document No. 1).

Patent Document No. 1: JP-A-5-50390

DISCLOSURE OF THE INVENTION

Problem that the Invention is to Solve

In the conventional robot systems (such as one shown in FIG. 5), since the teaching unit and the robot controlling unit are connected by the cable, even though the teaching unit is not visible nearby, in case traced back along the cable, the teaching unit can easily be found. However, when the teaching unit and the robot controlling unit are connected with the wireless connection, since the conventional cable is eliminated, although a teaching operation becomes easy, there may be caused a fear that for example, a person other than the teaching operator erroneously or carelessly closes the safety protective fence door or the safety protective fence door is closed by the effect of wind or the like, a closure signal is then outputted from the open-close detection unit to the robot controlling unit, and as this occurs, by misunderstanding the closure of the safety protective fence door as the completion of the teaching operation, an automatic operation (repeat of the operation program) is started without being aware of the teaching operator who lies in the vicinity of the robot. In addition, due to the wireless connection being used, not much attention is paid to the relation between the robot controlling unit and the teaching unit, which leads to a fear that the operator comes to be exposed to a danger for that reason.

The invention has been made in view of the problem and an object thereof is to provide a robot system with higher safety by disposing correctly a teaching unit relative to a feeding unit for feeding power to a battery of the teaching unit to thereby provide a feeding unit for charging the battery and issuing a teaching unit present signal which constitutes a signal for releasing an interlock for a robot to activate the operation of an operation program.

Means for Solving the Problem

With a view to solving the problem, the invention is configured as follows.

According to a first aspect of the invention, a robot system is provided with a robot, a robot controlling unit which controls the operation of the robot based on an operation program in a repeat mode, and a teaching unit which implements mutual transmission and reception of information with the robot controlling unit with a wireless connection, wherein the robot controlling unit comprises, a feeding unit which feeds a power to the teaching unit, and the teaching unit comprises a power receiving unit which receives the power from the feeding unit, and a battery which is charged with the power received by the power receiving unit, the feeding unit comprises a teaching unit detection device which detects that the teaching unit is disposed in a predetermined position of the feeding unit, when the feeding unit is disposed in the predetermined position of the feeding unit, the feeding unit supplies the power to the teaching unit and outputs a teaching unit present signal from the teaching unit detection device, when the teaching unit present signal is being outputted, the robot implements the operation program to repeat in the repeat mode in response to an operation start command.

According to a second aspect of the invention, the teaching unit comprises a non-contact information transmission device in which a predetermined information is recorded, the teaching unit detection device comprises a detector for reading the information recorded in the non-contact information transmission device, and the teaching unit detection device outputs the teaching unit present signal based on a verification result of a detector read information and a preset information.

According to a third aspect of the invention, a robot system is provided with a robot, a robot controlling unit which controls the operation of the robot based on an operation program in a repeat mode, and a teaching unit which implements mutual transmission and reception of information with the robot controlling unit with a wireless connection, wherein the robot controlling unit comprises, a feeding unit which feeds a power to the teaching unit, and the teaching unit comprises a power receiving unit which receives the power from the feeding unit, and a battery which is charged with the power received by the power receiving unit, the teaching unit comprises a non-contact information transmission device in which a predetermined information is recorded, the feeding unit comprises a detector which reads an intrinsic information recorded in the non-contact information transmission device when the teaching unit is disposed in a predetermined position of the feeding unit, the detector outputs to read the intrinsic information when the teaching unit is disposed in the predetermined position of the feeding unit, and the controller verifies the intrinsic information which is inputted from the detector and a registered information which is previously set, and validates or nullifies a teaching unit present signal based on a verification result, and when the teaching unit present signal is being validated, the robot implements the operation program to repeat in the repeat mode in response to an operation start command.

According to a fourth aspect of the invention, the non-contact information transmission unit comprises an RFID tag.

Advantage of the Invention

According to the first to fourth aspects of the invention, the feeding unit is provided which not only charges the battery but also issues the signal corresponding to the release of interlock for the robot to perform the operation of the operation program by the teaching unit being correctly disposed in the feeding unit for charging the battery, and the repeat of the operation program is started when the operation start command of the operation program (the activation signal) is inputted while the signal is being issued which corresponds to the release of interlock.

By this action, the robot system with high safety can be provided which prevents the activation of the operation program by an erroneous operation and eliminates a risk that the operator who is performing a teaching operation while holding the teaching unit in the vicinity of the robot is exposed to a danger.

Furthermore, according to the second to fourth aspects of the invention, the signal corresponding to the release of interlock is issued when the teaching unit which is paired with the robot controlling unit is disposed correctly in the feeding unit, and the fact that the teaching operator holding the teaching unit is not present in the vicinity of the robot can be confirmed in a more ensured fashion, the safety being thereby enhanced.

Figure 1:
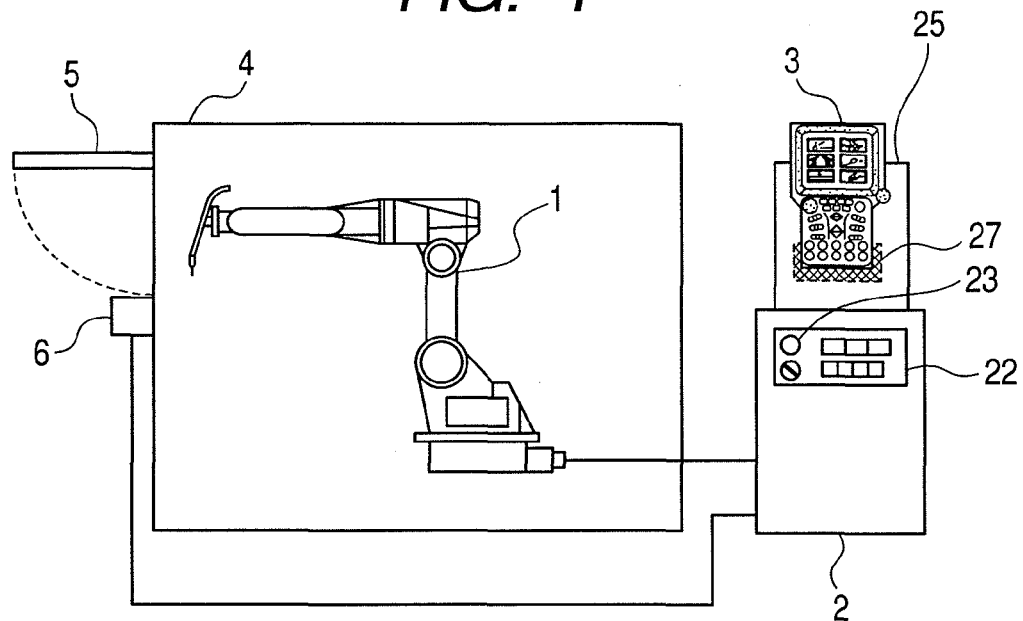
FIG. 1 A configuration diagram of a robot system according to an embodiment of the invention of the present patent application.

DESCRIPTION OF REFERENCE NUMERALS 1, 101 robot; 2, 102 robot controlling unit; 3, 103 teaching unit; 4, 104 safety protective fence; 5, 105 safety protective fence door; 6, 106 open-close detection unit; 21 controller; 22, 107 control section; 23 activation switch; 24 signal input/output unit; 25 feeding unit; 26 feeding device; 27 teaching unit detecting device; 28 power supply unit; 29 drive unit; 31 power receiving device; 32 battery; 33 RDIF tag; 34 detector.

BEST MODE FOR CARRYING OUT THE INVENTION

Hereinafter, embodiments of the invention will be described by reference to the drawings.

Embodiment 1

FIG. 1 is a configuration diagram of a robot system of an embodiment of the invention. In the figure, numeral 1 denotes a robot and numeral 2 denotes a robot controlling unit for controlling the robot 1. Numeral 3 denotes a teaching unit for mutually transmitting and receiving information with the robot controlling unit 2 by wireless connection. An operating range of the robot 1 is surrounded by a safety protective fence 4. A safety protective fence door 5 is provided at an exit/entrance in the safety protective fence 4. An open-close state of the safety protective fence door 5 is detected by an open-close detecting unit 6. An opening signal or closure signal is outputted to the robot controlling unit 2. A control section 22 which has an activation switch 23 for a selection of a teaching mode or a repeat mode and an operation program is provided on a control panel of the robot controlling unit 2. The control section 22 may be separated from the robot controlling unit 2 to be mounted on the safety protective fence 4 or a stand or a robot system control panel, not shown. A feeding unit 25 having a teaching unit detection device 27 is provided in the vicinity of the control section 22 which is present on the control panel of the robot controlling unit 2 or is separated therefrom.

When teaching the robot 1, even though the safety protective fence door 5 is opened and hence an opening signal is outputted from the open-close detection unit 6 by the teaching mode being selected from the control section 22, a power supply to a motor is enabled by operating an enable switch, not shown, which is equipped on the teaching unit 3. The robot 1 is caused to operate by operating a robot arm control key of the teaching unit 3 in such a state that power is being supplied to the motor, so as to register the addition or modification of a teaching point on to the operation program.

When the teaching operation is completed, the operator gets out of the safety protective fence 4 and closes the door 5 thereof, whereby a closure signal is outputted from the open-close detection unit 6 to the robot controlling unit 2. By an automatic operation mode (a repeat mode) being selected from the control section 22 in this state, a power supply command to supply power to the motor can be received, and when a power supply command is inputted, power is supplied to the motor. When the teaching unit 3 is placed (installed) correctly on the feeding unit 25, power is supplied to the teaching unit 3 from the feeding unit 25 so as to charge a battery, not shown, which is provided in the teaching unit 3, and a teaching unit present signal is outputted from the teaching unit detection device 27. When the operation program activation switch 23 provided on the control section 22 is depressed, a repeat operation of the operation program is started by the robot controlling unit 2 receiving an operation start command. In the event that the teaching unit 3 is placed (installed) correctly on the feeding unit 25, no teaching unit present signal is outputted, and even though the operation program activation switch 23 provided on the control section 22 is depressed, the operation program repeat operation is not started.

The operation start command can be inputted through operation of the teaching unit 3 or from the outside of the robot controlling unit 2 by depressing the operation program activation switch 23 from the control section 22. Further, the operation start command depends on a configuration condition such as a proposed control method of working equipment to which the robot system is applied.

Figure 2:
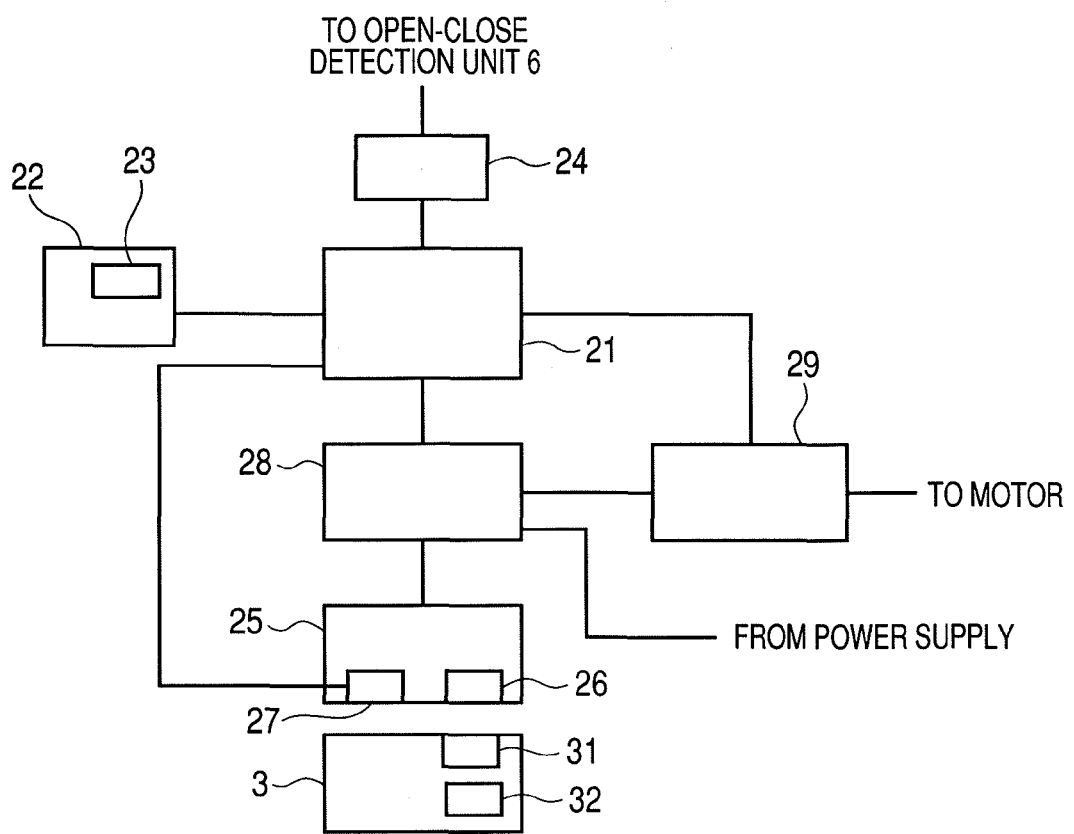
FIG. 2 A block diagram of a robot controlling unit according to the embodiment of the invention of the present patent application.

FIG. 2 is a block diagram of the robot controlling unit of the embodiment of the invention. In the figure, numeral 21 denotes a controller for controlling the whole of the robot controlling unit 2. Numeral 22 denotes the control section, which includes the mode selection switch and the operation program activation switch 23 and which is connected to the controller 21. Numeral 24 denotes a signal input/output unit, through which signals can be inputted into and outputted from equipment lying on the periphery of the robot 1 and mode selection and operation activation signals can inputted from the outside of the robot controlling unit 2. Numeral 25 denotes the feeding unit, which includes a feeding device 26 for feeding power supplied from a power supply unit 28 to the teaching unit 3 and the teaching unit detection device 27 for detecting that the feeding unit 25 is present in a predetermined position. Numeral 29 denotes a drive unit, which drives the motor provided on the robot 1 based on a drive command from the controller 21. Numeral 28 denotes the power supply unit, which is supplied with power from a power source so as to supply a control power supply and a drive power supply to locations which require such power supplies. A power receiving device 31 is provided on the teaching unit 3 for receiving power supplied from the feeding device 26 to charge a battery 32. However, when the battery 32 is charged sufficiently, the battery may not be charged to prevent overcharge.

In this figure, a configuration and the like which are related to a wireless connection are omitted.

When the teaching unit 3 is disposed (placed) in a predetermined position of the feeding unit 25 in such a state that the operation program is set (selected) through operation of the teaching unit 3, a teaching unit present signal is outputted from the teaching unit detection device 27 to the controller 21. Then, when the activation switch 23 of the control section 22 is depressed in such a state that a closure signal indicating a state in which the safety fence is closed is inputted from the open-close detection unit 6, with these conditions met, the operation program is activated, an operation command to operate the robot 1 is generated based on the operation program, and this operation command is outputted to the drive unit 29, whereby the motor provided on the robot 1 is driven.

As the teaching unit detection device 27, a momentary switch can be used which closes as soon as the teaching unit 3 is disposed (placed) correctly on the feeding unit 25.

In addition, when power is supplied from the feeding unit 25 to the teaching unit 3 by way of a cable and a connector, as the teaching unit detection device 27, the connector may be configured to detect its own fitting in a connector of the teaching unit 3.

Additionally, the feeding unit 25 may include a detector which can detect a charged state by detecting a charging current or a detector made up of a magnetic sensor so as to detect, together with the teaching unit detection device 27 provided thereon for detecting that the teaching unit 3 is placed on the feeding unit 25, the disposition (placement) of the teaching unit 3 on the feeding unit 25.

Embodiment 2

According to Embodiment 1, although the teaching unit 3 which is disposed on the feeding unit 25 is combined with the robot controlling unit 2, the teaching unit present signal is outputted. In Embodiment 2, this problem will be avoided.

Figure 3:
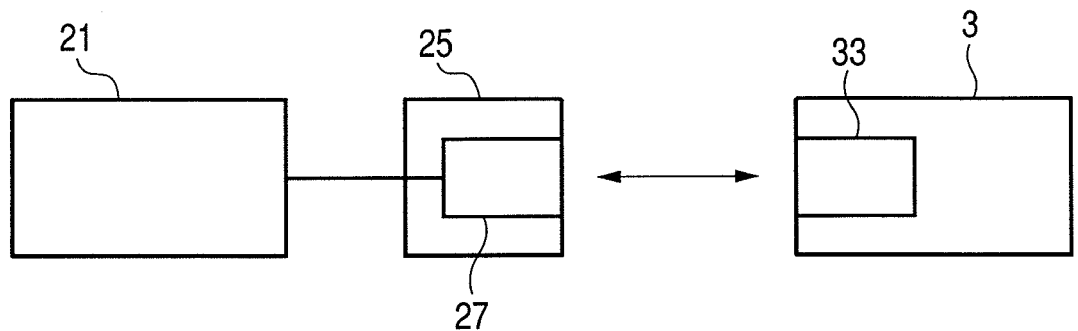
FIG. 3 A block diagram showing another example of a teaching unit detection device according to another embodiment of the invention of the present patent application.

FIG. 3 is a block diagram showing another embodiment of a teaching unit detection device. In the figure, reference numerals like to those of Embodiment 1 have configurations corresponding thereto, and the description thereof will partially be omitted. In the figure, a teaching unit 3 includes an RDIF tag 33 which is embedded or affixed to a predetermined position on a case, and when the teaching unit 3 is disposed in a predetermined position on a feeding unit 25, the feeding unit 25 includes a teaching unit detection device 27 for reading information in the RDIF tag 33 in a location which confronts the RDIF tag 33 of the teaching unit 3.

Intrinsic information which identifies a robot controlling unit 2 which connects the teaching unit 3 with the wireless connection is stored in the RDIF tag 33, and a reader for reading the information is provided on the teaching unit detection device 27.

Note that the RDIF tag is made up of an IC chip called RF tag and an antenna.

When the teaching unit 3 is disposed in the predetermined position on the feeding unit 25, the teaching unit detection device 27 reads the information in the RDIF tag 33 to verify it with registered information. When identifying the teaching unit 3 as one which is paired with the robot controlling unit 2 as a result of the verification, the teaching unit detection device 27 validates a teaching unit present signal.

The registered information may take any form, provided that the information can be verified with what is stored in the RDIF tag 33 of the teaching unit 3 which is paired therewith.

As an example, a production number of the robot controlling unit 2 is stored as the registered information, and the production number of the robot controlling unit 2 is stored in the RDIF tag 33 of the teaching unit 3 which is paired with the robot controlling unit 2. The same production numbers are verified with each other, and the teaching unit present signal is validated. When a teaching unit 3 which is not paired with the robot controlling unit 2 is disposed on the feeding unit 25, since the information read by the teaching unit detection device 27 and stored in the RDIF tag 33 is a different production umber from that of the robot controlling unit 2, a teaching unit present signal is not validated, and there occurs no situation in which an operation program is activated. Namely, when a different teaching unit is brought to be placed on the feeding unit, although charging is possible, since no operation command is outputted to a drive unit, the safety is ensured further.

When considering a possibility that the teaching unit 3 is used on a plurality of robot controlling units, although the information stored in the RDIF tag is changed as the robot controlling units which are objects to be connected with the wireless connection are changed, in the event that an RDIF reader/writer is provided on the teaching unit 3, through operation of the teaching unit 3 the verification and change of robot controlling units which are objects for connection.

Figure 4A:
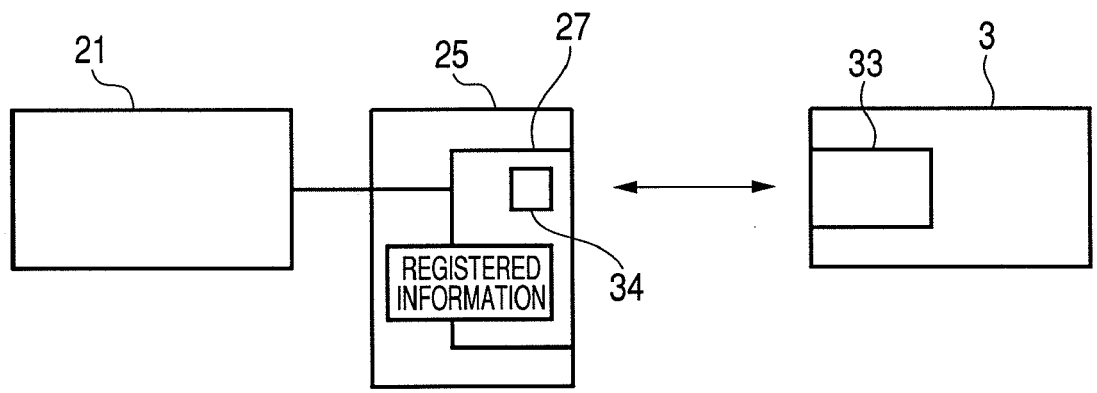
FIGS. 4A and 4B A block diagram illustrating a detection of a feeding unit.

FIG. 4 is a block diagram which illustrates a detection of the teaching unit. FIG. 4A shows a configuration in which the intrinsic information on the RDIF tag 33 is read by a detector 34, a verification of the read information with the registered information is implemented in the interior of the feeding unit 25, and a result is outputted to the controller 21. The identification of the teaching unit 3 which is paired with the robot controlling unit 2 is implemented in the feeding unit 25, and a teaching unit present signal is outputted to the controller. This configuration can easily be improved from Embodiment 1.

Figure 4B:
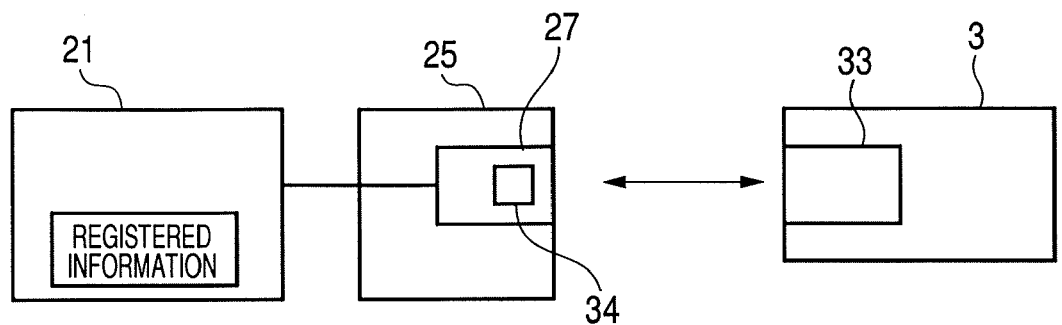
Figure 5:
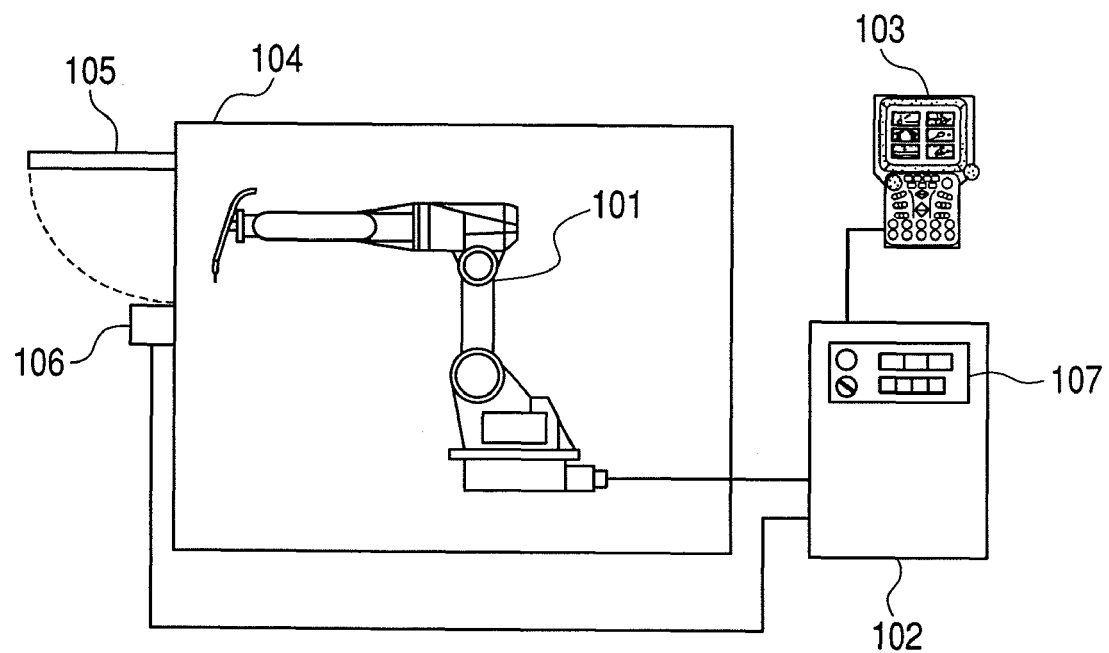
FIG. 5 A block diagram of a conventional robot system.

FIG. 4B shows a configuration in which the intrinsic information on the RDIF tag 33 is read by the detector 34, the information so read is then outputted to the controller 21, the information is then verified with the registered information which is stored in advance in the controller 21, the existence of the teaching unit 3 which is paired with the robot controlling unit 2 is identified, and the teaching unit present signal is then validated or nullified. In this configuration, since the collating mechanism is eliminated from the feeding unit 25, a cost reduction effect is provided compared with FIG. 4A.

INDUSTRIAL APPLICABILITY

As has been described heretofore, since the safety robot system can be configured which cannot be operated unless the teaching unit is disposed (placed) on the feeding unit which lies apart from the robot, the robot system of the invention can be applied to an application where the mode is changed from the teaching mode to the repeat mode in the vicinity of the robot, which operation would otherwise be prohibited for the safety reason.

The invention claimed is:
1. A robot system comprising:
a robot;
a robot controlling unit which controls an operation of the robot based on an operation program in a repeat mode; and
a teaching unit which implements mutual transmission and reception of information with the robot controlling unit with a wireless connection;
wherein the robot controlling unit comprises,
a feeding unit which feeds a power to the teaching unit, and the teaching unit comprises,
a power receiving unit which receives the power from the feeding unit, and
a battery which is charged with the power received by the power receiving unit,
the feeding unit comprises a teaching unit detection device which detects that the teaching unit is disposed in a predetermined position of the feeding unit,
when the teaching unit is disposed in the predetermined position of the feeding unit, the feeding unit supplies the power to the teaching unit and outputs a teaching unit present signal from the teaching unit detection device,
only while the teaching unit present signal is outputted, the robot executes the operation program to repeat in the repeat mode in response to an operation start command
when the teaching unit present signal is not outputted the operation program can not operate the robot in the repeat mode,
thereby providing enhanced safety to an operator
wherein
the teaching unit comprises a non-contact information transmission device in which a predetermined information is recorded,
the teaching unit detection device comprises a detector for reading the information recorded in the non-contact information transmission device, and
the teaching unit detection device outputs the teaching unit present signal based on a verification
result of a detector read information and a preset information.
2. A robot system comprising:
a robot;
a robot controlling unit which controls the operation of the robot based on an operation program in a repeat mode; and
a teaching unit which implements mutual transmission and reception of information with the robot controlling unit with a wireless connection;
wherein the robot controlling unit comprises,
a feeding unit which feeds a power to the teaching unit, and the teaching unit comprises,
a power receiving unit which receives the power from the feeding unit, and
a battery which is charged with the power received by the power receiving unit,
the teaching unit comprises a non-contact information transmission device in which a predetermined information is recorded,
the feeding unit comprises a detector which reads an intrinsic information recorded in the non-contact information transmission device when the teaching unit is disposed in a predetermined position of the feeding unit,
the detector reads the intrinsic information when the teaching unit is disposed in the predetermined position of the feeding unit, and
the controller verifies the intrinsic information which is inputted from the detector and a registered information which is previously set, and validates or nullifies a teaching unit present signal based on a verification result, and only while the teaching unit present signal is validated, the robot executes the operation program to repeat in the repeat mode in response to an operation start command and while the teaching unit present signal is not validated the robot can not execute the operation program to repeat in the repeat mode, thereby providing enhanced safety to an operator.

3. The robot system according to claim 1, wherein the non-contact information transmission device comprises an RFID tag.

4. The robot system according to claim 1, wherein an operating range of the robot is surrounded by a safety protector, and the robot controlling unit is provided outside of the safety protector, and wherein when the teaching unit is moved to outside of the safety protector and disposed in the predetermined position of the feeding unit, the robot executes the operation program.

5. The robot system according to claim 2, wherein an operating range of the robot is surrounded by a safety protector, and the robot controlling unit is provided outside of the safety protector, and wherein when the teaching unit is moved to outside of the safety protector and disposed in the predetermined position of the feeding unit, and the robot executes the operation program.

* * * * *